United States Patent

Goodwillie

[15] 3,665,904
[45] May 30, 1972

[54] AUTOMATIC VACUUM SPARK ADVANCE CONTROLLER

[72] Inventor: Richard E. Goodwillie, Detroit, Mich.
[73] Assignee: Chrysler Corporation, Highland Park, Mich.
[22] Filed: June 3, 1970
[21] Appl. No.: 43,090

[52] U.S. Cl. .................................................123/117 A
[51] Int. Cl. ..............................................F02p 5/04
[58] Field of Search ...............123/97, 97 B, 117, 117.1

[56] References Cited

UNITED STATES PATENTS 3,479,998   11/1969   Walker .....................................123/97
3,447,518   6/1969   Walker .................................123/117 A
3,272,191   9/1966   Walker .................................123/117 A Primary Examiner—Laurence M. Goodridge
Attorney—Talburtt and Baldwin

[57] ABSTRACT

A method of and apparatus for operation of an automotive vehicle internal combustion engine to reduce exhaust emissions thereof by disabling the engine vacuum spark advance control in response to and over a range of engine vacuum levels existing at or corresponding to medium to light vehicle acceleration loads up to a predetermined vehicle speed and restoring or enabling the normal vacuum spark advance control of the distributor when the vehicle is operated in any mode above said speed or during deceleration, steady speed or road load driving conditions below said speed.

8 Claims, 4 Drawing Figures

Patented May 30, 1972

3,665,904

INVENTOR.
Richard E. Goodwillie
BY Tilbutt & Baldwin
ATTORNEYS

AUTOMATIC VACUUM SPARK ADVANCE CONTROLLER

FIELD AND BACKGROUND OF THE INVENTION

This invention relates to exhaust emissions control of automotive vehicle internal combustion engines and seeks to provide a method of and apparatus for controlling such emissions from existing forms on internal combustion engines.

Such emissions are analyzed and measured with reference to an emissions standard measurement cycle, such as the currently employed Federal 7 Mode Emission Test Cycle, which measures the production of unburned hydrocarbon and nitrous oxide vehicles exhaust emissions over certain intervals or portions of vehicle operation over a predetermined sequence of a plurality of different idle, acceleration, steady speed and deceleration modes. The highest contribution of hydrocarbon and nitrous oxides to such emissions are noticeably produced over the acceleration modes of the cycle in which the emissions are measured over a 0–25 mph portion of one specified acceleration mode and over a 15–30 mph portion of another acceleration mode of a different acceleration rate.

It is known that some measure of emissions control may be achieved with present forms of engines and associated equipment by retarding the engine timing from the distributor. This expedient results in elevated exhaust temperatures and consequent prolongation and promotion of more complete combustion of the gases expelled into and from the exhaust system.

Among the methods considered to retard engine timing over acceleration modes encompassing or within the test cycle are to retard or prevent the normal spark advance control of the distributor while the vehicle is operated at low vehicle speeds or in low transmission gear position and to permit such spark advance only when the vehicle is operated at speeds above a predetermined cutoff speed or in high gear position. However, both of these methods of modifying distributor spark advance control may affect engine performance and driveability and result in some loss of fuel economy while the vehicle is operated with retarded spark at low speed or in low gear during deceleration, steady speed or road load conditions which do not have a significant contribution to the production of such exhaust emissions over the measurement cycle. Transmission controlled spark advance, moreover, may provide premature restoration of the spark advance and result in higher emissions output where the transmission shift into high gear position occurs at a vehicle speed below that specified in the emissions measurement cycle. Consequently, this method of modifying spark advance control may not be readily adapted for extension to emissions measurement cycles requiring control at vehicle speeds higher than those presently specified.

Accordingly, the present invention seeks to provide a method of and apparatus for reducing vehicle exhaust emissions by controlling the engine spark advance in a manner that avoids the disadvantages and limitations of the above discussed methods of modifying engine spark advance control.

The invention has for its object to produce a vehicle exhaust emissions controller operable over pre-selected portions of those vehicle operating conditions, which produce a high output of such emissions, without impairing engine performance, driveability and fuel economy over other vehicle operating conditions which do not significantly affect the production of such emissions.

A specific object is to produce a vehicle exhaust emissions controller in accordance with the foregoing and responsive to engine suction prevailing for a vehicle acceleration above a predetermined rate up to a predetermined speed without affecting engine performance, driveability and fuel economy during deceleration, steady speed or road load driving conditions above or below said predetermined speed.

A more specific object is to provide a vehicle exhaust emissions controller which is responsive both to vehicle acceleration loads as measured by or in terms of sensed engine vacuum, and to vehicle speed and is under the joint control of vehicle acceleration loads above a predetermined rate and vehicle speeds below a predetermined speed.

SUMMARY OF THE INVENTION

Towards the accomplishment of the above and other objects, the invention provides an automatic vacuum spark advance control system which is effective to disable the normal vacuum modulation of the distributor spark advance when the vehicle is operated below a predetermined speed at light to medium acceleration loads as sensed by a vehicle speed sensor switch and by a vacuum switch responsive to engine intake manifold vacuum. A solenoid operated vacuum control valve interposed in the vacuum line to the distributor vacuum spark advance unit is under the joint control of the speed switch and the vacuum switch to open the vacuum line to atmosphere in the event both conditions, i.e., speed and load as measured by engine vacuum, are within their respectively assigned switching points. An ambient temperature control switch is also provided to override the conjoint disabling control function of the speed switch and the vacuum switch irrespective of vehicle speed and engine load when the ambient temperature is below a predetermined temperature.

The structural organization of the apparatus of the invention will appear from consideration of the detailed description of the preferred embodiment of the invention made with reference to and following the accompanying drawings.

DESCRIPTION OF THE PREFERRED EMBODIMENT

Figure 1:
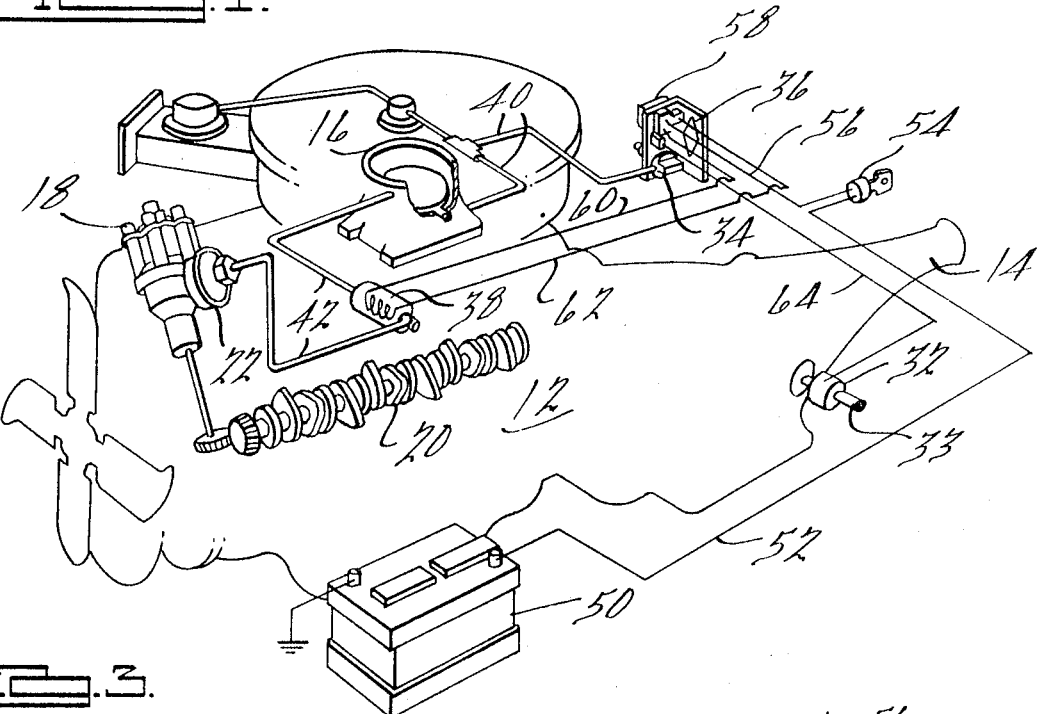
FIG. 1 illustrates a vehicle emissions controller in accordance with the present invention as employed in a vehicle internal combustion engine.

FIG. 1 illustrates the emissions controller of the present invention installed on the engine 12 of a vehicle having an automatic transmission 14. Also shown are a carburetor 16 and an ignition distributor 18, which is driven from the engine cam shaft 20 and may be of the type shown in U.S. Pat. No. 2,688,055, for example. The distributor includes a vacuum operated actuator unit 22 providing the spark advance control function of the distributor in accordance with the application of ported spark advance vacuum from the carburetor 16. The emissions controller functions to disable the normal vacuum modulation of the distributor spark advance mechanism under predetermined conditions and comprises a vehicle speed switch 32, a vacuum switch 34, a temperature switch 36 and a solenoid valve 38.

The speed switch 32 is shown mounted directly at the vehicle transmission 14 in line with the speedometer cable 33 and is a bistable snap-action switch having a pair of electrical switch contacts set to operate from one electrical condition (open or closed) to the opposite electrical condition (closed or open) by a centrifugally operated speed sensing and actuating mechanism, such as shown for example in U. S. Pat. No. 2,758,172. Various other forms and locations of speed sensitive switches could also be employed such as a switch mounted in the head of the vehicle speedometer or a hydraulically actuated differential pressure switch operated from the transmission governor pressure such as shown in copending U.S. Pat. applications Ser. No. 863,108 and Ser. No. 15,532 of common ownership herewith.

The vacuum switch 34 senses engine load as measured by engine manifold vacuum during acceleration periods of the engine and is a pressure responsive diaphragm actuated electrical switch that is connected over conduit 40 to a point downstream of the carburetor throttle or to a region exposed to engine intake manifold pressure. Like the speed sensing switch, the vacuum switch is a bistable switch of the snap-action variety having a pair of electrical switch contacts set to operate from one electrical condition (open or closed) to its opposite electrical condition (closed or open) when the engine vacuum increases a predetermined level below atmospheric in the direction of greater or higher vacuum.

The temperature switch 36 is a snap-action thermal switch responsive to ambient temperature and has a pair of electrical switch contacts set to operate from one electrical condition to the opposite electrical condition when the ambient temperature rises above a predetermined level. The snap-action characteristic of the several switches assures reliable and positive switch operation and aids in the elimination of contact bounce problems.

THe solenoid vacuum valve 38 may be of the type shown in U.S. Pat. No. 1,761,513 and is interposed in the vacuum feed line 42 between the carburetor 16 and the vacuum actuator unit 22 connected with the distributor spark advance control mechanism. When the solenoid coil is energized the valve opens the vacuum line 40 to atmosphere, thereby disabling and eliminating the vacuum spark advance control of the distributor mechanism.

Figure 3:
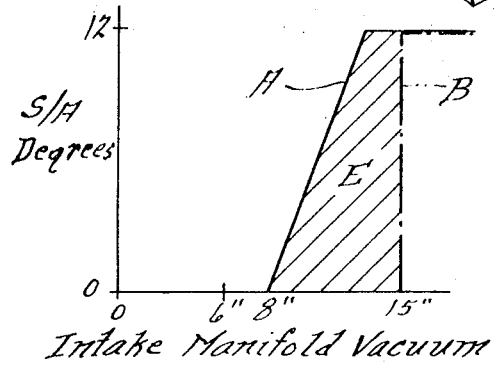
FIG. 3 illustrates the effect of the emissions controller of the present invention on the distributor vacuum spark advance control of the engine.
Figure 2:
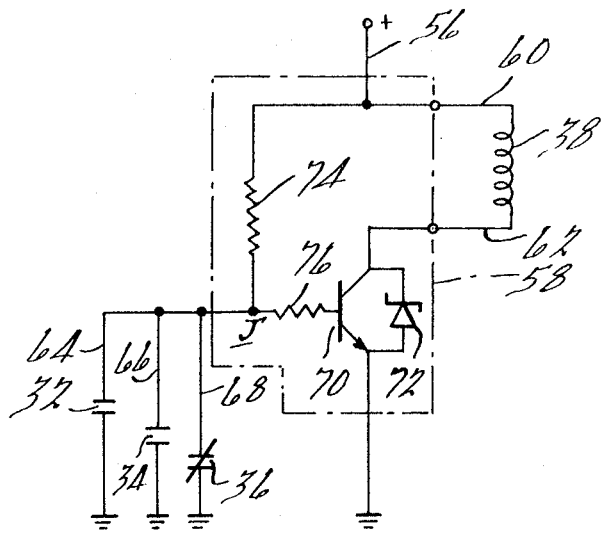
FIG. 2 is an electrical schematic representation of an electronic switching section and associated components of the emissions controller of FIG. 1.

The above described elements are included in an electrical circuit from the vehicle battery 50 connected over conductor 52 through the vehicle ignition switch 54 and conductor 56 to an electronic switching unit 58, which is controlled from the switches 32, 34 and 36, to control the energization of the solenoid valve 38 connected to the switching unit over circuit conductors 60 and 62. The speed switch is connected to the control unit 58 by circuit conductor 64 while the vacuum switch and temperature are connected thereto by conductors 66 and 68 as indicated in FIG. 3.

The electronic switching unit 58 is mounted with the vacuum switch 34 and the temperature switch 36 on the firewall of the vehicle engine compartment and permits lower switching currents and consequent reduction of arcing at the contacts of the control switches than would otherwise occur if the switches were connected directly in the energization circuit of the solenoid valve coil. As illustrated in the schematic electrical circuit of FIG. 3, the switching unit 58 comprises an NPN transistor 70 having a transistor protecting zener diode 72 connected across its collector and grounded emitter output electrodes and a pair of biasing and current limiting resistors 74 and 76 connected in a voltage divider arrangement from B+ to the base input of the transistor, as shown.

The contacts of the speed switch, vacuum switch and the temperature switch are shown connected in parallel between ground and the input control point or voltage divider junction J of the switching module which is activated or conducting to complete the energization circuit of the solenoid valve from the battery only when all of the control switches are in their open circuit condition. If any one or more of the control switches is closed, the potential at point J is reduced to ground level to render the transistor non-conductive and de-energize the solenoid valve 36. The illustrated switching unit performs a logical inversion of the condition of the input control switches, all of which must be off or open in order for the switching unit to be on, the switching unit being rendered off if any one or more of the input control switches is closed.

From the foregoing, it can be seen that the subject emissions controller is effective to disable or eliminate the vacuum spark advance under the conjoint coincident control or response to engine load as sensed by manifold vacuum, vehicle speed and the ambient temperature, all of which conditions must be within predetermined limits at the same time in order to render the disabling function effective.

In order to conform or tailor the emissions controller for operation with the emissions standard measurement cycle, such as the above discussed Federal Cycle for example, the speed switch 32 is set to operate at a speed of 30–31 mph corresponding to the present upper limit at which the emissions are sampled in this cycle. For speeds below and up to this limit, the speed switch contacts are in an electrical condition, i.e., open with reference to the switch module of FIG. 3, to permit the energization of the solenoid valve, depending upon the condition of the vacuum switch and the temperature switch.

The vacuum switch 34 is set to operate at a vacuum level of say 15 inches of mercury below atmospheric, so that for moderate to light engine loads occurring within a range of say from 6–15 inches of mercury and corresponding to the acceleration ranges within the sampling ranges of the emissions cycle, the vacuum switch contacts will be in a condition that would energize the solenoid valve 38 when the vehicle speed is below the 31 mph upper speed limit of the cycle. During steady speed, road load or deceleration operating situations as encountered in city driving conditions for example, the manifold vacuum will be in a range of from 15 to say 30 inches of mercury, and the vacuum switch contacts will then be in their opposite or closed condition to prevent the energization of the solenoid valve irrespective of the condition of the speed sensing switch 32.

The temperature switch 36 is set to operate for ambient temperatures above 68° F. conforming to the temperatures at or above which the emissions are measured in the emissions measurement standard cycle. At temperatures below this level, its contacts would be closed to disable the controller and restore the normal vacuum modulation of the distributor, as the production of exhaust emissions is somewhat diminished at lower ambient temperatures.

OPERATION

Figure 4:
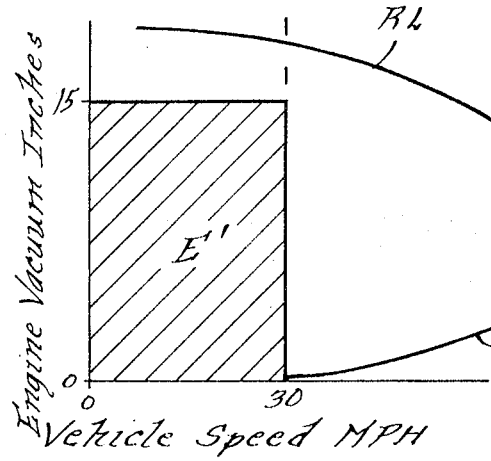
FIG. 4 illustrates the effect of the emissions controller on several different vehicle operating conditions.

The effect of the subject emissions controller on various operating conditions of the vehicle may be understood from FIGS. 3 and 4 in which FIG. 3 is a plot of vacuum spark advance in terms of engine intake vacuum in the disabled, or inoperative, and in the enabled, or operative, conditions of the controller. FIG. 4 is a plot of intake vacuum vs. vehicle speed for different vehicle operating conditions. In FIG. 3 the solid curve A is the normal vacuum spark advance control curve of the distributor as would prevail in the disabled or inoperative condition of the subject controller. The normal vacuum spark advance available to the distributor control unit commences to exert its influence at a vacuum level of approximately 8 inches of mercury and adds to the engine governor spark advance control curve, not shown. The vacuum level at wide open throttle and high load operating conditions is in the order of 0 to 3 inches and is insufficient to exert any perceptible spark advance of the distributor which is then entirely under the control of engine governor advance or engine speed.

The dotted curve B illustrates the disabling or restricting influence of the subject controller on the engine vacuum spark advance when the vehicle is accelerated at medium to light engine loads occurring between 6 to 15 inches of mercury at vehicle speeds below 30 mph. Under these conditions the controller is operative and functions to eliminate the vacuum spark advance otherwise available at such vacuum loads over the shaded region E between the curves A and B. Thus, vacuum spark advance is eliminated during these operating conditions, leaving only engine governor spark advance, whereby the engine timing is retarded for the stated emissions control purposes. At those vehicle operating conditions where engine vacuum is greater than 15 inches, as during road load steady speed cruising or decelerating conditions, full vacuum spark advance would be available at vehicle speeds below 30 mph, thus affording optimum engine performance and fuel economy over these driving conditions.

The subject system thus affords an advantage over vehicle speed or transmission controlled spark advance systems which are unconditionally responsive to vehicle speed or transmission gear position and would, therefore, eliminate vacuum spark advance for all vehicle operating conditions below a predetermined vehicle speed or while the vehicle is operated in low transmission gear position. In the latter case, when the vehicle is operated at such acceleration rates where the transmission should shift into high gear position at speeds below the cutoff speed specified in the emissions standard measurement cycle, vacuum spark advance would be prematurely restored over those sampled portions of the cycle and result in increased output of emissions.

The effect of the subject emissions controller is illustrated in somewhat different form in FIG. 4 in which the curves RL and WOT illustrate variations in engine vacuum with vehicle speed at road load and wide open throttle, respectively. The vehicle acceleration curves would fall somewhere between the road load and wide open throttle curves, and, at speeds below 30 mph would pass through the shaded region E' over which the normal vacuum spark advance available to the distributor unit is eliminated by the subject controller. Since the engine vacuum at road load driving conditions is above or greater than 15 inches and does not pass through the shaded region E', the vacuum spark advance modulation of the distributor is unaffected by the emissions controller to permit advantageous operation of the engine at advanced, rather than at retarded spark as would otherwise be the case with a purely speed responsive form of emissions controller. Since the spark advance is restored at speeds above 30 mph, the subject controller has no effect on wide open throttle operation and would permit whatever vacuum spark advance is available at such speeds to advance the spark while the vehicle might still be operated in low gear during heavy acceleration conditions.

I claim:

1. The method of operating the vacuum actuated spark advance timing control of a vehicle internal combustion engine for reduction of exhaust emissions therefrom comprising the steps of sensing vehicle speed, sensing engine vacuum, and disabling any engine vacuum otherwise normally available to the engine spark advance timing control when both vehicle speed and engine vacuum are simultaneously below certain predetermined levels except when the vehicle is operated at vehicle speeds in excess of a predetermined vehicle speed at any engine vacuum level or at engine vacuum levels in excess of a predetermined vacuum level at any vehicle speed below the said predetermined vehicle speed level.

2. The method in accordance with claim 1 wherein said predetermined ambient temperature is approximately 68° F.

3. A vehicle exhaust emissions controller for an internal combustion engine including a carburetor having a spark advance port and a throttle valve therein, a source of electrical energy and an ignition distributor having an engine suction responsive spark advance control mechanism connected to said spark advance port, said controller comprising in combination, a solenoid valve in the connection between said carburetor spark advance port and said suction responsive spark advance control mechanism and energizable from said source of electrical energy to disable operation of said spark advance control means from the suction at said spark advance port, a first bistable electrical switch actuable in response to vehicle speed when the vehicle speed attains a predetermined speed, a second bistable electrical switch actuable in response to engine vacuum in a region posterior of said throttle valve when the engine vacuum attains a predetermined vacuum level below atmosphere, and a third bistable electrical switch actuable in response to the temperature of the air surrounding the engine when the ambient air temperature attains a predetermined temperature, said first and second electrical switches connected in energizing control relation with said solenoid to disable said engine suction responsive spark advance means when both vehicle speed and engine suction are less than said predetermined vehicle speed and said vacuum level and connected in de-energizing control relation with said solenoid to enable said engine suction responsive spark advance means when either vehicle speed or engine vacuum is greater than said predetermined speed or vacuum level, said third electrical switch connected in de-energizing control relation with said solenoid valve to enable said engine suction responsive spark advance control means irrespective of vehicle speed and engine vacuum when the ambient temperature is below said predetermined temperature.

4. The invention of claim 3 wherein said predetermined vehicle speed is approximately 30 mph, said predetermined vacuum level is approximately 15 inches below atmospheric, and said predetermined temperature is approximately 68° F.

5. A vehicle exhaust emissions controller for an internal combustion engine providing a source of vacuum and equipped with a source of electrical energy, an ignition distributor having an engine vacuum responsive spark advance control means and conduit means connecting said spark advance control means to said source of engine vacuum, said emissions controller comprising a solenoid valve in the conduit connecting means between said source of vacuum and said spark advance control means and energizable from said source of electrical energy to disable operation of said spark advance control means from said source of vacuum, a bistable electrical switch responsive to vehicle speed and operable to cause the energization of said solenoid valve and disable operation of said spark advance control means for vehicle speeds below a predetermined vehicle speed, and a bistable electrical switch responsive to temperature of the air surrounding the engine and operable at temperatures below a predetermined ambient temperature to prevent the energization of said solenoid valve from said speed switch irrespective of the speed of the vehicle.

6. A vehicle exhaust emissions controller in accordance with claim 5 wherein said predetermined vehicle speed is approximately 30 mph and said predetermined ambient temperature is approximately 68° F.

7. The method of operating the vacuum actuated spark advance timing control of a vehicle internal combustion engine for reduction of exhaust emissions therefrom comprising the steps of sensing vehicle speed, sensing the ambient temperature of the air surrounding the engine and disabling the engine vacuum actuated spark advance timing control when the vehicle is operated at vehicle speeds below a predetermined vehicle speed except when the ambient temperature is below a predetermined temperature;

8. The method in accordance with claim 7 wherein said predetermined vehicle speed is approximately 30 mph and said predetermined ambient temperature is approximately 68° F.

* * * * *